June 22, 1948.    R. W. ATKINSON    2,443,974

INSULATED ELECTRICAL CABLE

Filed Nov. 2, 1944

Inventor

Ralph W. Atkinson

By George J. Schossler

Attorney

Patented June 22, 1948

2,443,974

UNITED STATES PATENT OFFICE 2,443,974

INSULATED ELECTRICAL CABLE

Ralph W. Atkinson, Westfield, N. J., assignor to General Cable Corporation, New York, N. Y., a corporation of New Jersey Application November 2, 1944, Serial No. 561,591

10 Claims. (Cl. 174—25)

This invention relates to insulated electrical cables and more particularly to cables insulated with materials combining a number of desirable qualities including low dielectric power factor, high insulation resistance, high stability against oxidation even when heated, and a low rate of deterioration when subjected to electrical stress. It is an object of the invention to provide improved insulated cables. Other objects and advantages of the invention will appear hereinafter.

The invention will be understood from the following description when read in the light of the accompanying drawing disclosing an illustrative embodiment of the invention and also disclosing comparatively, by graphs, certain improved characteristics of insulated conductors embodying the present invention. In the drawing.

Figure 1:
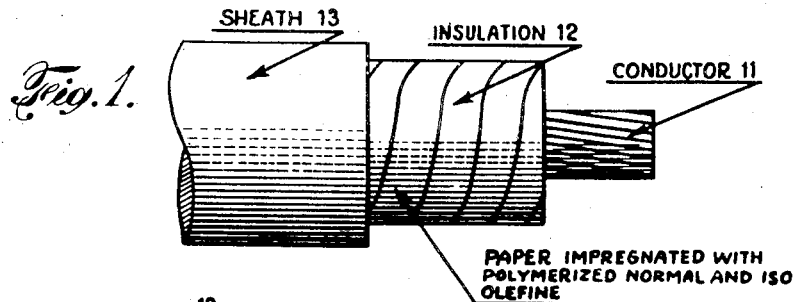
Fig. 1 shows an insulated and sheathed cable.

In the transmission of electrical power at high voltages underground it is the usual practice to insulate the cable conductor with a plurality of overlying paper tapes which are subsequently impregnated with an insulating compound, usually a mineral oil or a mixture of mineral oil and a resin, and then to enclose the insulated conductor within a fluid-tight sheath, usually an extruded lead sheath.

Oils heretofore used as high voltage electrical cable insulation saturants have been subject to deterioration in use primarily from two causes, (1) as a result of oxidation or chemical change, and (2) as a result of ionization caused by electrical stresses. Such deterioration results (1) in increase in power factor and dielectric loss, or (2) in reduced dielectric strength with consequent liability to failure, or in both. In the one case the result is reduced serviceability and reduced ability to carry power and in the other case ultimate failure and inability to operate at all.

The deterioration of the cable saturant as a result of oxidation or chemical change may take place without respect to the presence of electrical stress. It may occur upon free exposure of the oil to oxygen, or upon exposure to limited supply of oxygen, or even when the oil is stored free from oxygen or external sources of chemical action other than presence within the container of copper or copper oxide in contact with the oil. In a well refined petroleum oil such changes, in the absence of external sources of oxygen, take place more freely when the oil has been previously exposed to oxygen and appear to result from action of the metal upon the partially oxidized oil. In general, deterioration of this type is greatly hastened by increasing temperatures.

The second named type of deterioration is caused by ionization and is directly produced as a result of electrical stress. This type of deterioration is exhibited by the change of the saturant through successive stages of increased viscosity to a final insoluble solid having a waxy appearance and often called "wax." Accompanying this change is an evolution of hydrogen and, commonly, an increased power factor and dielectric loss. Because of the decreased volume occupied by the solid residue of the saturant, the cable appears to be "dry" and is incompletely saturated. This incomplete saturation is the primary cause of the poor properties of the resultant cable which has the poorer dielectric strength of a cable inadequately saturated in the first place. The extent of ionization continues to increase in the enlarging gas spaces commonly referred to as "voids." The increased ionization produces continually more serious effects culminating in the formation of carbonized paths and eventually in failure.

The oxidation or chemical type of deterioration is well illustrated by cable saturated with an unrefined or lightly refined petroleum oil. Not only is the initial power factor of such a cable high but the power factor increases very greatly when the cable is heated even when sealed in a tightly capped lead sheath. The power factor of such oil increases greatly when the oil is subjected to oxidation, or is heated in the presence of copper and in the absence of external supply of oxygen.

Such an oil contains a considerable proportion of unsaturated hydrocarbon materials, both aromatic and olefinic. Further refinement improves the power factor and resistance to deterioration by oxidation, but also reduces the proportion of both types of unsaturant.

The reduction of the unsaturants of petroleum oils as a result of continued refining reduces resistance to deterioration as a result of ionization. For example, a highly refined petroleum oil, such as a "white oil" which cable engineers often refer to as "over-refined," contains mostly saturated components because the unsaturated molecules are removed by the refining process. Such an oil releases hydrogen copiously, with the accompanying deterioration previously described, when subjected to ionization as a result of electrical stress apparently due to the lack of unsaturated molecules.

In use of petroleum oils for cable saturants, experience has indicated the necessity of a compromise between very light refining and "over-refining." This results in an oil that has some degree of chemical stability and yet is more resistant than is the "white" oil to the effect of ionization. However, such an oil is at best a poor compromise and much is lacking in both respects. The general situation is well stated in specific recommendations made by F. M. Clark, in "Industrial and Engineering Chemistry," March 1939, page 327, and January 1942, page 110.

In those papers Clark points out that refining removes the olefinic unsaturants much more readily than the aromatic. Since he finds that a petroleum oil containing more than a very small quantity of olefinic unsaturant is poor, he concludes that olefinic unsaturants are harmful. He concludes that the tolerable upper limit of olefinic unsaturant is not greater than about 1% or 2% and accepts as high a value as that only because of the practical difficulty of further reduction without too completely eliminating the aromatic unsaturants. He believes these latter to be desirable, but is satisfied with the approximately 20% of aromatic unsaturants which can be retained with the residual 1% or 2% of olefinic unsaturants.

For brevity I shall use the expression "good electrical properties" to indicate low power factor and dielectric loss and high stability of these properties where the dielectric is not under electrical stress, at any operating temperature, as well as good radial power factor. Similarly, I shall use the expression "ionization characteristics" to indicate the degree of stability of a material when subject to the effects of electrical stress.

I have discovered that certain synthetic hydrocarbon oils produced for use either alone or in admixture with refined naturally occurring petroleum oils as lubricants have properties which particularly adapt them for impregnating high tension electrical cables insulated with paper or other pervious insulating material. So far as I am aware, these oils have not been used previously for electrical insulating purposes and it had not been known prior to my discovery that these oils combined numerous outstanding properties for electrical insulating purposes. These synthetic oils differ in composition in two important respects from refined naturally occurring petroleum oils: (1) in the number and arrangement of carbon and hydrogen atoms in the molecule; and (2) in their freedom from sulphur and other non-hydrocarbon constituents. Essentially, they are characterized as consisting substantially entirely of unsaturated components, and as containing only substantially pure hydrocarbons and as having a power factor of less than 1% at 100° C. The proportions of unsaturants may be divided in any proportion between olefinic and aromatic unsaturants, as determined by accepted tests described hereinbelow. The particular material for which test results are given herein contained 75% to 80% of olefinic unsaturants. Another material described herein is substantially wholly aromatic unsaturant according to these tests, but other more specific tests such as the reaction with bromine demonstrate conclusively the presence of olefinic unsaturants in large amounts.

The expression "unsaturation," "aromatic unsaturation" and "olefinic unsaturation" with reference to hydrocarbon compounds have rather definite and well understood technical meanings. In general, unsaturated hydrocarbon compounds have a certain type of chemical activity inasmuch as each molecule has what is called an unsatisfied bond. Specifically these bonds are ready to pick up additional atoms without splitting off any materials. Of the two types of unsaturation the olefinic type is the more active. This chemical activity, and this difference in degree of activity, makes it possible to separate (destructively) the unsaturated molecules from each other and from the saturated molecules for the purpose of measurement.

For the purpose of this patent, it may be considered that the total unsaturants are measured by the first of the two following tests and that the olefinic unsaturants are measured by the second test. The aromatic unsaturants will be considered as the difference between these two values. As a matter of fact these tests are accepted for the determination of aromatic and olefinic unsaturation, although it is known that some materials are incorrectly classified by this method.

For the purpose of this discussion, then, the total "unsaturation" of a hydrocarbon liquid is defined by the following sulphuric acid-phosphorus pentoxide test procedure:

10 milliliters of oil at 25° C. are cooled to 15° C. in a Babcock sulphonation bottle, the neck of which is graduated for 10 ml. in 0.20-ml. divisions. To the oil is added a cold acid mixture consisting of concentrated (96%) sulphuric acid containing 30 grams of phosphorus pentoxide per 100 ml. This acid mixture is added in the following portions until a total of 30 ml. have been added to the oil: 1 ml., 1 ml., 1 ml., 2 ml., 5 ml., 10 ml., 10 ml. After each acid addition the oil is shaken vigorously for 15 seconds and the mixture cooled to 15° C. After the acid mixture has all been added, the oil is allowed to settle for one hour at 15–20° C. Sufficient concentrated sulphuric acid is carefully added to bring the oil level within the range of the graduated scale of the bottle. The acid mixture is then allowed to settle over night. The per cent total unsaturation of the oil is $$\frac{\text{ml. of oil absorbed}}{\text{original volume of oil used}} \times 100$$

The olefinic unsaturation may be determined in the same manner except that an acid mixture containing 5 grams of boric acid in 100 ml. of concentrated sulphuric acid 96% is substituted for the phosphorus pentoxide-acid mixture.

The test procedures herein given are taken from an article by F. M. Clark and E. L. Rabb in "Industrial and Engineering Chemistry," vol. 34, page 111 (1942).

The synthetic oils of this invention are produced by the catalytic polymerization of gaseous or low boiling point olefines of molecular weight less than 90 under conditions which will result in the production of polymers such as herein described. These oils have the properties of viscous liquids rather than of solid plastics. One preferred form of such oils consists of polymers of normal and isobutylenes. Another form consists of polymers of propylene. The preferred polymers may be of high viscosity index as compared with the viscosity indices of products previously obtained from an isobutylene-normal butylene polymerization reaction, and their oily liquid character distinguishes them from strictly isobutylene polymers of plastic character heretofore prepared by the slow polymerization of pure isobutylene at —100° F. or thereabouts.

Briefly, the method of production of the particular, preferred polymer of normal and isobutylenes mentioned above comprises bringing in contact with a halide olefine polymerizing catalyst, at a temperature within the range of 0° F. to 120° F., a substantially dewatered and desulphured liquified initial olefinic hydrocarbon material of less than 6 and consisting in major part of 4 carbon atoms per molecule accompanied by corresponding separated aliphatic hydrocarbons, to cause the polymerization of both normal olefines and iso-olefines, separating the polymerizing catalyst and associated non-hydrocarbon reaction product from the produced liquid polymers and non-polymerized hydrocarbons and then separating the produced polymers from non-polymerized hydrocarbons.

A liquified initial olefinic hydrocarbon material comprising essentially propylene, which has 3 carbon atoms per molecule, may be treated in a similar manner to produce a polymer of propylene having the desirable properties herein described.

For production of any oil used in this invention, particular precautions are taken prior to the olefine polymerizing reaction to remove substantially all sulphur and sulphur-containing compounds from the low boiling point olefines which are to be polymerized. This is important to the polymerization reaction and also to insure that the produced polymers are substantially sulphur free.

Likewise, substantially all water desirably is removed from the olefine-containing material prior to the polymerization step and water and steam are rigidly excluded during the polymerization reaction, and kept away until the catalyst and its spent products are completely removed. Where this is not done the resultant product is contaminated with non-hydrocarbon materials which are deleterious in their effect on the electrical properties.

The temperatures maintained during the polymerization reaction, the concentration of low boiling point olefines in the olefine containing mixture undergoing polymerization, and the relative proportions of normal and iso-olefines in the mixture, where both are present, all have a material effect upon the viscosity and the viscosity index of the polymers produced. One oil produced by this process and found to be particularly adapted for impregnating high tension paper insulated cables has an average molecular weight of approximately 450 and a viscosity index of about 75. This oil has a viscosity at 210° F. of about 150 seconds Saybolt and a viscosity at 100° F. of about 3500 seconds Saybolt.

The viscosity of the synthetic oil may vary over a considerable range without substantially affecting the desirable electric characteristics. Other oils of higher molecular weight, up to approximately 1000, may be employed. Such 1000 molecular weight oil made from a butylene and isobutylene mixture may have a viscosity at 210° F. of about 1750 seconds Saybolt Universal, a viscosity at 100° F. of about 67,000 seconds Saybolt Universal, and a viscosity index of about 115. Preferably the viscosity of an oil to be used for cables made as hereinabove described exceeds about 75 seconds Saybolt Universal at 210° F., and about 900 seconds Saybolt Universal at 100° F. The maximum viscosity that may be used is limited only by the maximum at which impregnation may be secured and viscosity as great as 3200 seconds at 210° F. with 145,000 seconds at 100° F. has been found practical.

The viscosity index of the synthetic oils produced by the described methods may vary considerably. The preferred material will have an index exceeding about 60, but good results may be had with a viscosity index as low as 40.

Referring now to Fig. 1 of the drawing, there is shown by way of illustration a cable comprising a stranded conductor 11 wrapped with a plurality of overlying paper tapes to build up a wall of insulation 12, which is enclosed within a fluid-tight sheath 13, usually of lead. The insulating wall 12 may be provided with a thin electrostatic shielding layer on its surface adjacent the conductor, or on its surface adjacent the sheath, or both, if desired. Since the shielding is well known and of itself comprises no part of the present invention it has not been shown on the drawing.

It is the customary practice to dry, evacuate and then impregnate the paper insulation 12 with an insulating compound, usually a refined naturally occurring petroleum oil or a mixture of such an oil and a resin. According to the present invention this paper insulation is impregnated with material comprising a synthetic hydrocarbon oil of the type above described. The impregnated cable may then be sheathed, for example with lead.

These synthetic oils have exceptionally low dielectric power factor, high insulation resistance, outstanding stability of their electrical properties when exposed to oxidation, even when subjected to heat, and a low rate of deterioration when subjected to electrical stress. This stability against oxidation is reflected not only in the small change of electrical properties on such treatment but also in the relative stability of oil which has been so treated when used in cable insulation and subjected to further long-time application of heat.

Commonly the power factor at 60 cycles is less than ½ of 1% at all temperatures up to 100° C. and remains as low as this even when the oil is heated with free exposure to the air for a period of 48 hours at 150° C. Such a test causes only slight change in the color of the oil and does not cause sludging or appreciable development of harmful acids. Oils combining, as do these synthetic oils, the characteristics of very small change in electrical properties and little or no change in other properties upon heating in the presence of air are exceptional.

It has been recognized for a number of years that the power factor of oil impregnated, paper insulated cables changes after manufacture and that not infrequently large increases in power factor occur even in cables which are merely stored without load. In order to demonstrate the aging characteristics of cable made according to this invention I have made successive power factor measurements on short sealed lengths of cable placed in an oven at about 100° C. Cables which were the same in construction except for the fact that one was impregnated with a synthetic oil of this invention whereas the other was impregnated with a refined petroleum oil commonly used in high quality cables have been tested over a period of about three and one-half months and the striking differences in aging characteristics are illustrated in Fig. 2 of the drawing.

Figure 2:
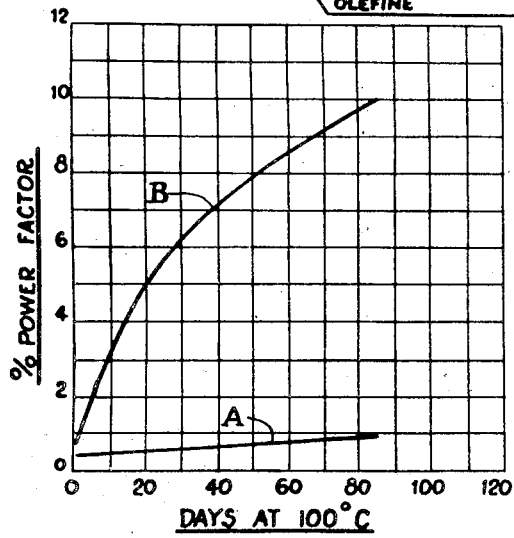
Fig. 2 is a graph showing the change of power factor with time due to temperature alone for the improved cable of this invention and also for a high quality cable made according to existing standards and specifications.

Fig. 2 is a graph showing the power factor in per cent plotted against the time in days in the oven at 100° C. Curve A represents the cable of the present invention and it will be seen that the power factor, initially less than about 0.5%, has increased gradually to only about 1% after 85 days at 100° C. Curve B shows the power factor for the cable impregnated with petroleum oil to have been only slightly higher than the other cable initially, but to have increased manyfold to about 10% at the end of 85 days.

The reasons for the change in power factor and dielectric loss of the petroleum oil cable under these conditions are not fully understood and there are wide differences of opinion among cable engineers. Whatever the explanation, it is clear that cable made according to the present invention shows such a small increase in power factor compared to cables heretofore available as to make the new cable outstanding in this respect. It has been shown that very small quantities of certain constituents of petroleum oils—such as asphalts which contain considerable proportions of non-hydrocarbon material—are very effective in producing this type of instability. It seems altogether probable that the essential reason for the less favorable electrical properties of cables saturated with petroleum oils as compared to the new cable is the difference in freedom from non-hydrocarbon constituents.

If the power factor of individual paper tapes is measured as they are removed, one at a time, from a cable and the resulting power factor measurements plotted against the position of the tape, the resulting curve has been called a "radial power factor" curve. These data are also spoken of, in a general way, as the "radial power factor" of the insulation of the cable.

Figure 3:
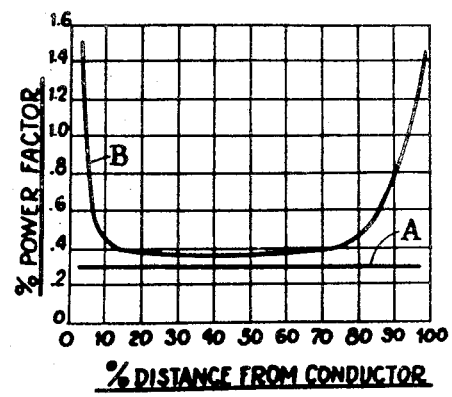
Fig. 3 is a graph showing radial power factor curves for the improved cable of this invention and also for high quality cable heretofore available.

Numerous radial power factor tests have been made on cables impregnated with the synthetic oils of this invention and on cables impregnated with refined petroleum oils such as were heretofore used for impregnating cables. Fig. 3 of the drawing shows by way of comparison radial power factor curves for my improved cable and for the prior art cable. Curve A is a straight line showing practically uniform power factor in the insulation of my improved cable over the entire range from the conductor radially to the sheath. While this particular curve was for cable impregnated with a polymer of butylenes, the same type of curve is obtained for cable impregnated with a polymer of propylene such as is herein described. Curve B is a generally typical U-shaped curve showing the relatively high power factor in the insulation adjacent the conductor and the sheath in cable of the prior art.

When oils refined from a petroleum base are heated with consequent increase in power factor, the oil is subject to selective adsorption or extraction of its constituents when used for impregnating paper. This results in the concentration of the harmful products in certain layers of the paper insulation, adjacent to the conductor and the sheath, and in the localization of the electrical losses with a worse overall result than would be obtained if the oil were not selectively extracted. The synthetic oils of this invention show no characteristics of selective extraction, and thus possess no characteristics of bad radial power factor.

Oils such as herein described, because of their substantial freedom from non-hydrocarbon impurities, have a low "spreading power" and low "penetrating power" comparable to that of the purest petroleum oils used for saturating cable insulation. High spreading power of an oil is quite generally, and probably inherently, caused by certain constituents of the oil which are different in molecular structure from other parts. These constituents contributing high spreading or penetrating power have high "surface activity" causing them to adhere to or be adsorbed by the paper structure of a cable. This adsorption inherently causes a separation of the parts of the oil—effectively a filtering action. The bad radial power factor described elsewhere herein is commonly a result of such a filtering action. With an oil of low spreading and penetrating power there can be no such differential adsorption with resulting bad radial power factor. While it has been suggested that high spreading and penetrating power may contribute toward ease in impregnation, practical experience in cable making and testing shows that effectively complete saturation is secured with oils having very low spreading power. The inherent low spreading power of these oils is thus of important advantage with no offsetting disadvantages.

A serious difficulty with presently available petroleum oils which are low in power factor and high in resistance to oxidation is that these oils have an undesirably high rate of deterioration when subjected to electrical stress. This arises from the fact that these oils have poor resistance to the effect of electronic bombardment. Paper insulated cable saturated with a refined petroleum oil which is heated and cooled in a manner similar to that encountered by cable in service has "voids," or more accurately gaseous spaces of low pressure, formed in the insulation and is subject to relatively rapid deterioration when subjected to electrical stress. Commonly, low power factor petroleum oils are worse in this respect than are some of the other petroleum oils which do not have as good power factor characteristics.

Cables similar in construction except that one was impregnated with a synthetic oil of this invention and the other was impregnated with refined petroleum oil have been tested and a comparison of the test data shows a very much lower rate of deterioration and change of saturant for the synthetic oil when both cables are subjected to the same conditions.

By way of illustration, specific data obtained in testing two cables which were identical except for the impregnating material will be outlined here. The cables were 3 conductor 350,000 C. M. shielded type cables with an insulation thickness of 250 mils on each conductor. In the test, the cables, carefully sealed at their ends with pressure gauges attached were "seasoned" by heating the conductor to a temperature of approximately 95° C. for 24 hours by passing current through the conductors, thereby distending the lead sheath by 40 to 60 mils in diameter, and then cooling to room temperature for 24 hours. Thereafter the cables were subjected to 60 cycle voltage between each conductor and sheath, the voltage initially being 34,000 volts and increasing daily in a geometric ratio by approximately 1.8% to result in doubling of the voltage in 38 days. During the first 12 days that the cable was under voltage the following additional conditions were imposed:

1st, 4th and 7th days: current was passed through the conductors sufficient to raise the conductor temperature to approximately 90° C.

8th to 12th days, inclusive: the cables were packed in ice.

During the 2nd, 3rd, 5th and 6th days and throughout the remainder of the test beyond the 12th day, the cables were left without the application of auxiliary heat or cold.

As a result of the expansion of the oil during the "seasoning" treatment and the consequent stretching of the lead sheath, followed by the contraction of the oil on cooling, voids were produced within the insulation. In these tests it was found that the absolute pressure in the insulation at the end of the "seasoning" treatment commonly is less than 10% of atmospheric pressure.

The application of dielectric stress by impressing voltage between the conductors and sheath results in ionization within the voids formed in the insulation by the contraction of the saturant. The electrical discharge causes progressive changes in the dielectric and the evolution of gas. In time this evolved gas will raise the low pressures within the insulation to atmospheric pressure and higher, and finally even to pressures such as will stretch or burst the sheath.

In the tests on cable saturated with petroleum oil, atmospheric pressure was reached in about ten days, the voltage at that time being 40,000 volts. The electrical power factor had increased to about 2.5%.

In the tests on the cable saturated with the synthetic oil it took 19 days before atmospheric pressure was reached, at which time the voltage was 47,500 volts. The power factor, even at the higher voltage and after the much longer time, was only 1.35%.

In the first cable the pressure in the insulation rose to an absolute pressure of 3 atmospheres in 20 days, the voltage at that time being 48,000 volts and the power factor still 2.5%. In the second cable the pressure did not reach an absolute pressure of 3 atmospheres until after 36 days and a voltage of 66,000 volts. Meantime the power factor had risen, but only to 1.65%. It will be seen from the foregoing that approximately twice the time was required to produce a given change in the synthetic oil cable as compared with the petroleum oil cable and that this change occurred only after a very considerably higher voltage had been impressed. Had the voltage been maintained on the second cable at the lower value of the first cable the length of time required for a corresponding change in pressure would have been much greater. These tests showed that the voltage at the time any given change had taken place was 20 to 30% higher for the synthetic oil cable and that the time required even at the higher voltage was nearly twice as long.

When cable of the first type was dissected after test it was found to be "filled with wax." More accurately, the surplus impregnating material occupying the space between tapes had been converted largely into a solid insoluble substance which has been compared to wax in appearance. In the other cable, impregnated with synthetic oil, only a very small amount of the converted impregnating material could be found by careful examination and the general appearance of the cable was substantially the same as before the test.

The generally accepted explanation of the changes taking place in the first cable is that these changes are due to bombardment of the impregnating material by electrons in the ionized spaces within the cable. This bombardment results in polymerization of the oil with the evolution of hydrogen. As the polymerized material is considerably higher in density, its formation results in producing still larger spaces, thereby increasing the possibility of ionization and progressively increasing the rate of deterioration.

The effect of electronic bombardment has been demonstrated more directly in the following manner. The apparatus consists of a substantially spherical flask about 4½" in diameter, provided with a mercury manometer for the measurement of internal absolute pressure, and means for evacuation, admission of oil and insertion of a metal electrode of convenient shape and size. In the test here described the electrode used was of brass, was of substantially cylindrical shape approximately 1" in diameter and approximately 1" long. The flask was placed in a salt water bath maintained at approximately 95° C. and evacuated to an absolute pressure of 2 mm. of mercury or less. 25 ml. of the oil to be tested were then admitted very slowly so as to permit of complete degassing. The top surface of the oil in the bottom of the flask was a circle of about 2½" diameter. The flask was then closed off from the vacuum source, the pressure in the flask being still no greater than 2 mm. of mercury absolute. A 60 cycle voltage of 8000 volts was next applied between the metal electrode and the salt water bath resulting in electrical discharges from the metal electrode to the oil surface and thus producing electronic or ionic bombardment of the oil. This in general results in liberation of gas or vapors from the oil, raising the internal pressure, which is registered on the mercury manometer.

A synthetic oil of this invention as used in one of the cables described hereinabove showed a pressure increase of 43 mm. of mercury after 5 hours' bombardment. A high grade petroleum oil used in the other cable described hereinabove showed a similar pressure increase in approximately 30 minutes. Further bombardment produced a continued increase in pressure at a more accelerated rate, in the latter case.

The synthetic oils of this invention have much higher resistance to such bombardment than have the customary petroleum oils. It is clear that there is much less liberation of hydrogen from the electronic action. Whatever may be the technical explanation of what happens, the fact remains that cables impregnated with the synthetic oils of this invention exhibit much lower deterioration under electrical stress than cables impregnated with petroleum oils heretofore used.

Refined naturally occurring petroleum oils such as are used for impregnating paper insulated cables have a sulphur content of the order of 0.2% to 0.3%. The olefinic gases and liquids available as raw materials for olefinic synthetic oils have a comparable sulphur content which will be retained in the final polymerized product unless treated as herein described. The method of producing synthetic oils which I have described is capable of producing oils having 0.01% or less of sulphur content. One synthetic oil which I have tested and found to have the desirable characteristics enumerated has a sulphur content of the order of 0.03%.

The method of impregnation described hereinabove is not the only one by which successful impregnated paper insulated cables may be produced when suitable saturants are used. In particular, two other methods may be used, one particularly adapted to the use of a relatively fluid oil, the other particularly adapted to the use of an extremely viscous oil. In cables of the so-called oil-filled type, longitudinal oil channels are provided at the axis of the conductor or elsewhere in the cross-section. Instead of being impregnated before lead covering, the completed but unimpregnated core is lead covered. It is subsequently impregnated by oil admitted through the longitudinal channels. Drying may be done before lead covering or through the channels after lead covering, or both. In any event the cable is evacuated through the channels prior to impregnation. By the other method the tapes are impregnated prior to being applied to the cable and the cable subsequently sheathed with lead or other covering. The preimpregnation of the tapes may be performed while the tapes are in the form of "pads" or rolls or may be done by passing the paper through a bath of heated saturant.

For cables of the oil-filled type, it has been customary to use oil having a viscosity at 100° F. of about 100 seconds Saybolt, though values half or twice that are permissible as far as concerns viscosity. Too low a viscosity gives rise to problems in handling of cable ends during installation due to drainage. The higher limit of viscosity is really determined by low temperature characteristics—the oil must flow sufficiently freely in the channels at the lowest temperature of operation to permit the saturant to flow through the channels to reservoirs provided to care for expansion and contraction. For this purpose the viscosity of the oil at 30° F. should not exceed say 700 seconds Saybolt.

For preimpregnated tapes, viscosities at 210° F. as high as 3500 have been used successfully and it is possible that oils having the same viscosity at temperatures 20° F. or 30° F. higher than this may be found preferable.

In general, the desirable properties contributed to the cable by the saturant here described are achieved whatever be the process of manufacture of the cable.

From the foregoing it will be apparent that the synthetic hydrocarbon oils substantially free from sulphur and other non-hydrocarbon constituents, having high viscosity index and having the properties of viscous liquids rather than solid plastics, combine a number of properties which make them outstanding as electrical insulating oils. While the synthetic oil desirably is employed for insulating cables without the addition of other saturants in order that its advantages may be enjoyed to the fullest extent, nevertheless the synthetic oil may be mixed with petroleum oil or a resin if desired. The electrical performance of such a mixture will be improved as compared with that of the petroleum oil or resin, but will in general be inferior to that of the synthetic oil alone because of the behavior of the inferior component.

The properties of these viscous synthetic oils which make them peculiarly suitable for impregnating cables also make them desirable for filling the joint casings and terminals of impregnated cables. For such use it may be preferred to employ oils of relatively higher viscosity.

This application is a continuation-in-part of my copending application Serial No. 370,191, filed December 14, 1940 which has been abandoned.

While certain preferred embodiments of the invention have been described by way of illustration, it is to be understood that the invention is not to be so limited as it may have various other modifications within the limits of the prior art and the scope of the subjoined claims.

I claim:

1. An electric cable having commonly a power factor at 60 cycles of less than 1% at temperatures up to 100° C., practically uniform radial power factor in the insulation from the conductor to the sheath, high insulation resistance, high stability against oxidation when heated, and a low rate of deterioration when subjected to electrical stress, said cable comprising an electrical conductor and an insulation therefor including oil-pervious insulation impregnated with a high viscosity synthetic oil, said oil comprising a substantially uncontaminated hydrocarbon polymer of low boiling point olefines and consisting essentially of unsaturated molecules as determined by the sulphuric acid-phosphorus pentoxide test, said saturant being substantially free from tendency to be selectively adsorbed.

2. An electric cable having commonly a power factor at 60 cycles of less than 1% at temperatures up to 100° C., practically uniform radial power factor in the insulation from the conductor to the sheath, high insulation resistance, high stability against oxidation when heated, and a low rate of deterioration when subjected to electrical stress, said cable comprising an electrical conductor and an insulation therefor including oil-pervious insulation impregnated with a high viscosity synthetic oil, said oil comprising a substantially uncontaminated hydrocarbon polymer of low boiling point olefines and consisting essentially of unsaturated molecules as determined by the sulphuric acid-phosphorus pentoxide test, and having more than about 70% olefinic unsaturation as determined by the sulphuric acid-boric acid test, said saturant being substantially free from tendency to be selectively adsorbed.

3. An electric cable having commonly a power factor at 60 cycles of less than 1% at temperatures up to 100° C., practically uniform radial power factor in the insulation from the conductor to the sheath, high insulation resistance, high stability against oxidation when heated, and a low rate of deterioration when subjected to electrical stress, said cable comprising an electrical conductor and an insulation therefor including oil-pervious insulation impregnated with a high viscosity synthetic oil which exhibits no characteristics of selective adsorption of its constituents, said oil having a molecular weight of less than 1000, a viscosity at 210° F. of from 75 to about 150 seconds Saybolt Universal and at 100° F. of from 900 to about 3500 seconds Saybolt Universal, and a viscosity index of from 60 to about 75, said oil being a direct polymer of normal and iso-olefine monomers, having less than 6 and in major part 4 carbon atoms in each unit of the polymer, and containing not more than about 0.05% of free and combined sulphur.

4. An electric cable having commonly a power factor at 60 cycles of less than 1% at temperatures up to 100° C., practically uniform radial power factor in the insulation from the conductor to the sheath, high insulation resistance, high stability against oxidation when heated, and a low rate of deterioration when subjected to electrical stress, said cable comprising an electrical conductor and an insulation therefor including oil-pervious insulation impregnated with a high viscosity synthetic oil which exhibits no characteristics of selective adsorption of its constituents, said oil having a molecular weight of less than 1000 and preferably about 450 to 500, a viscosity at 210° F. greater than about 75 and preferably about 150 seconds Saybolt Universal and at 100° F. greater than about 900 and preferably about 3500 seconds Saybolt Universal, and a viscosity index greater than about 60 and preferably about 75, said oil being a direct polymer of normal and iso olefine monomers, having less than 6 and in major part 4 carbon atoms in each unit of the polymer, and containing not more than about 0.05% of free and combined sulphur.

5. An electric cable having commonly a power factor at 60 cycles of less than 1% at temperatures up to 100° C., practically uniform radial power factor in the insulation from the conductor to the sheath, high insulation resistance, high stability against oxidation when heated, and a low rate of deterioration when subjected to electrical stress, said cable comprising an electrical conductor and an insulation therefor including oil-pervious insulation impregnated with a high viscosity synthetic oil which exhibits no characteristics of selective adsorption of its constituents, said oil having a viscosity at 210° F. of not less than about 75 seconds Saybolt Universal and a viscosity index of not less than about 60 and having a viscosity and viscosity index not greater than those which characterize an oil such as herein described having a molecular weight of approximately 1000, said oil being a copolymer of normal and isobutylenes of less than 6 and in major part 4 carbon atoms in each molecule produced by direct polymerization of the mixed monomers in the presence of a halide olefine polymerizing catalyst, and containing not more than about 0.05% of free and combined sulphur.

6. An electric cable having commonly a power factor at 60 cycles of less than 1% at temperatures up to 100° C., practically uniform radial power factor in the insulation from the conductor to the sheath, high insulation resistance, high stability against oxidation when heated, and a low rate of deterioration when subjected to electrical stress, said cable comprising an electrical conductor and an insulation therefor including oil-pervious insulation impregnated with a high viscosity synthetic oil having a viscosity at 210° F. of not less than about 75 seconds Saybolt Universal and a viscosity index of not less than about 60 and having a viscosity and viscosity index not greater than those which characterize an oil such as herein described having a molecular weight of approximately 1000, said oil being a copolymer of normal and iso-olefines of less than 6 and in major part 4 carbon atoms in each molecule produced by direct polymerization of substantially sulphur free and water-free monomers in the presence of a halide olefine polymerizing catalyst to the exclusion of water and steam, and containing not more than about 0.05% of free and combined sulphur.

7. An electric cable having commonly a power factor at 60 cycles of less than 1% at temperatures up to 100° C., practically uniform radial power factor in the insulation from the conductor to the sheath, high insulation resistance, high stability against oxidation when heated, and a low rate of deterioration when subjected to electrical stress, said cable comprising an electrical conductor and an insulation therefor including oil-pervious insulation impregnated with a high viscosity synthetic oil which exhibits no characteristics of selective adsorption of its constituents, said oil having a viscosity at 210° F. of not less than about 75 seconds Saybolt Universal and a viscosity index of not less than about 60 and having a viscosity and viscosity index not greater than those which characterize an oil such as herein described having a molecular weight of approximately 1000, and being a copolymer of normal and isobutylenes of less than 6 and in major part 4 carbon atoms in each molecule produced by direct polymerization of the mixed monomers in the presence of a halide olefine polymerizing catalyst.

8. An electric cable having commonly a power factor at 60 cycles of less than 1% at temperatures up to 100° C., practically uniform radial power factor in the insulation from the conductor to the sheath, high insulation resistance, high stability against oxidation when heated, and a low rate of deterioration when subjected to electrical stress, said cable comprising an electrical conductor and an insulation therefor including oil-previous insulation impregnated with a high viscosity synthetic oil having a viscosity at 210° F. of not less than about 75 seconds Saybolt Universal and a viscosity index of not less than about 60 and having a viscosity and viscosity index not greater than those which characterize an oil such as herein described having a molecular weight of approximately 1000, said oil being a direct polymer of a mixture of normal and iso-olefine monomers and having less than 6 and in major part 4 carbon atoms in each unit of the polymer.

9. An electric cable having commonly a power factor at 60 cycles which after the cable has been subjected to a temperature of 100° C. for 80 days does not exceed about 1%, high insulation resistance, and a low rate of deterioration when subjected to electrical stress, said cable comprising an electrical conductor and an insulation therefor including a synthetic oil which exhibits no characteristics of selective adsorption of its constituents, said oil having a viscosity at 210° F. of not less than about 75 seconds Saybolt Universal and a viscosity index of not less than about 60 and having a viscosity and viscosity index not greater than those which characterize an oil such as herein described having a molecular weight of approximately 1000, and being a direct polymer of a mixture of normal and iso-olefine monomers, having less than 6 and in major part 4 carbon atoms in each unit of the polymer, and containing not more than about 0.05% of free and combined sulphur.

10. An electric cable having commonly a power factor at 60 cycles of less than one per cent at temperatures up to 100° C., practically uniform radial power factor in the insulation from the conductor to the sheath, high insulation resistance, high stability against oxidation when heated, and a low rate of deterioration when subjected to electrical stress, said cable comprising an electrical conductor and an insulation therefor including oil-pervious insulation impregnated with a synthetic oil produced by direct polymerization of substantially water-free normal and iso olefine monomers of less than six and in major part four carbon atoms in each molecule in the presence of a halide olefine polymerizing catalyst, said oil being a substantially uncontaminated hydrocarbon polymer having a substantial olefinic unsaturation, said oil being free from surface active constituents and having a low spreading and penetrating power which is comparable to that of pure petroleum cable oils.

RALPH W. ATKINSON.

REFERENCES CITED

The following references are of record in the file of this patent:

UNITED STATES PATENTS

| Number | Name | Date |
|---|---|---|
| 2,165,372 | Haag | July 11, 1939 |
| 2,165,373 | Hofmann | July 11, 1939 |
| 2,216,253 | Schneider | Oct. 1, 1940 |
| 2,219,867 | Gay | Oct. 29, 1940 |
| 2,220,307 | Whitcley | Nov. 5, 1940 |
| 2,224,349 | Holm | Dec. 10, 1940 |
| 2,274,031 | Bannon | Feb. 24, 1942 |
| 2,278,445 | Hull | Apr. 7, 1942 |
| 2,320,313 | Thomas et al. | May 25, 1943 |

OTHER REFERENCES

Sullivan et al., "Synthetic lubricating oils," Ind. and Eng. Chem., vol. 23, No. 6; June 1931; pages 604 to 611.